June 18, 1929.   J. W. FOLEY   1,717,673
ROLLER BEARING
Filed July 27, 1927   2 Sheets-Sheet 1

Inventor:
John W. Foley
By

June 18, 1929.  J. W. FOLEY  1,717,673
ROLLER BEARING
Filed July 27, 1927   2 Sheets-Sheet 2

Inventor:
John W. Foley.
By

Patented June 18, 1929.

1,717,673

UNITED STATES PATENT OFFICE.

JOHN W. FOLEY, OF CHICAGO, ILLINOIS.

ROLLER BEARING.

Application filed July 27, 1927. Serial No. 208,764.

This invention relates to improvements in roller bearings, and one of the objects of the same is to provide an improved bearing of this character whereby the radial and end thrust will be distributed to all of the rollers and transmitted therethrough to the casing or box, and at the same time the end plates of the casing will be relieved of strain and the necessity for use of balls for receiving end thrust will be obviated.

A further object is to provide an improved bearing of this character in which the rollers are of a sectional construction, thereby facilitating in assembling the parts.

A further object is to provide an improved bearing of this character in which the parts are so arranged that all wear may be readily compensated for by the adjustment of the sections of the respective rollers with relation to each other.

Figure 1:
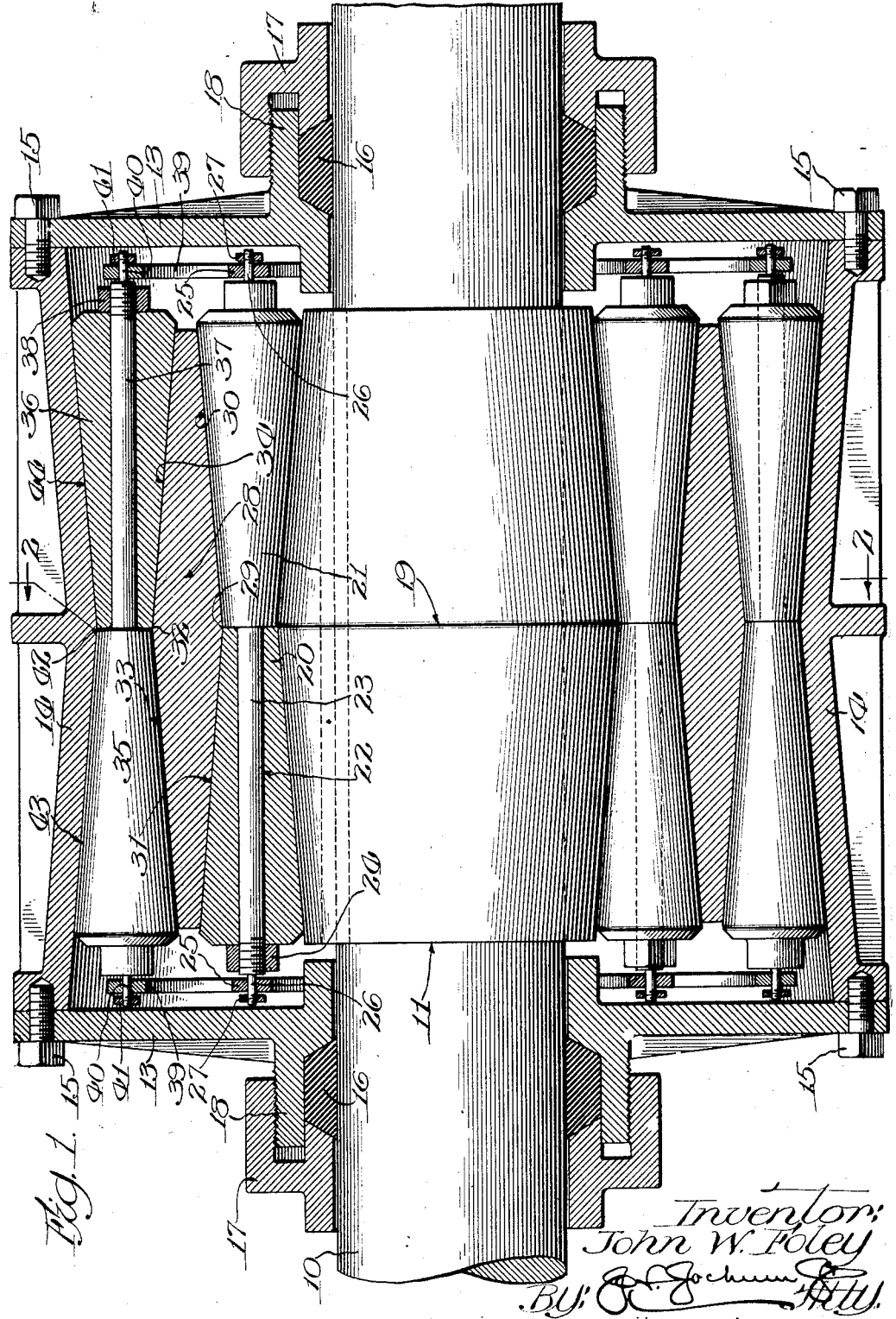

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a sectional view taken on line 1—1, Figure 2, of a bearing of this character constructed in accordance with the principles of this invention.

Figure 2:
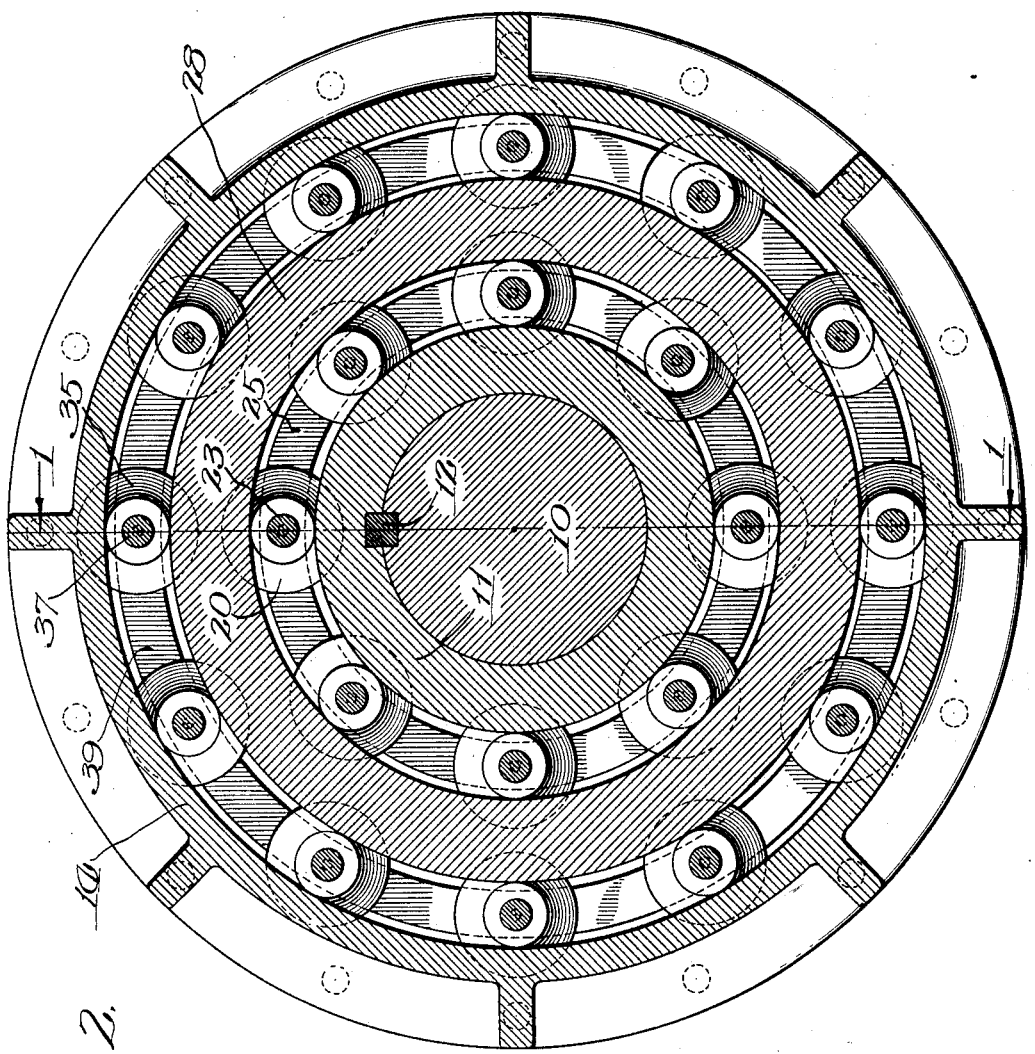

Figure 2 is a transverse sectional view taken on line 2—2, Figure 1.

Referring more particularly to the drawings the numeral 10 designates generally a shaft to which is secured a bearing sleeve 11. The sleeve may be secured to the shaft in any suitable manner but preferably by being keyed thereto as at 12.

The bearing sleeve 11 may be of any desired length and diameter and is disposed within a box or casing having end walls 13 and a circumferential body portion 14, to which the end walls are secured by means of suitable fastening devices 15.

The shaft 10 may be provided with suitable packing 16 and packing nuts 17 which are threaded on to the tubular portions 18 of the respective end members 13.

The periphery of the sleeve 11 tapers from the longitudinal center 19 thereof toward the outer ends so as to form opposed frustro-conical bearing surfaces, and engaging the respective surfaces are rollers, any number of which may be provided.

These rollers are preferably formed of two sections 20—21, each of which sections is of a conical construction. The roller section 20 is provided with an opening 22 extending longitudinally therethrough and secured to the section 21 is a rod or bar 23 which passes through the opening 22 in the roller 20 and substantially fills the opening. The rod 23 projects beyond the free extremity of the roller section 20 and threaded thereon is a nut or collar 24, by means of which the sections 20—21 may be secured together end to end. The smaller ends of the roller sections abut each other so that the surface of the roller formed by the sections 20—21 taper from the outer ends of the roller sections towards the longitudinal center thereof to coincide with the peripheral surface of the bearing sleeve 11.

Any number of these rollers may be employed and the rollers of the series are held together and in spaced relation for rotation with respect to each other and upon the periphery of the bearing sleeve 11, preferably by means of annular members 25 which are provided with openings therein to receive trunnions 26 on the ends of the rollers, and the rollers and annular members 25 are held against displacement with respect to each other by means of nuts or collars 27 threaded upon the trunnions 26.

Encompassing the rollers is a floating sleeve 28, the inner surface of which tapers from the outer ends towards a central point 29 as at 30—31, and with which surfaces the roller sections 20—21 respectively have rolling engagement.

The periphery of the sleeve 28 tapers from a central point 32 toward the free ends thereof as at 33—34 and another series of rollers embodying sections 35—36 engage these surfaces 33—34.

These latter rollers are preferably of the same construction as the inner series of rollers and each embodies sections 35—36. The section 36 is provided with an opening therethrough into which a rod 37 secured to the section 35, passes, and the rod projects beyond the end of the roller section 36, a nut or collar 38 being threaded upon the rod for holding the sections together.

The peripheries of the roller sections 35—36 taper from the free ends toward the longitudinal center of the roller, so that the peripheries of the roller sections 35—36 will coincide with and rotate upon the respective surfaces 33—34, of the sleeve 28.

The outer series of rollers are secured together against relative displacement by means of an annular member 39 which encompasses the annular member 25, and trunnions 40 on the ends of the rollers of the outer series pass through suitable openings in the annular members 39, nuts or collars 41 being secured to the trunnions 40 for holding the parts against displacement.

The inner surface of the body portion 14 of the casing tapers from the outer ends thereof to a point 42 adjacent the longitudinal center of the casing to provide diverging surfaces 43—33 and 44—34 with which the respective roller sections 35—36 have rolling contact.

With this improved construction it will be manifest that the rollers of the respective series will be held against longitudinal movement inasmuch as the opposed diverging and converging adjacent faces of the proximate parts will hold the rollers against longitudinal movement while at the same time the parts will not be locked against a free rotary movement with respect to each other and also bodily about each other.

With such a construction the end thrust will not be directed against the end walls of the bearing or casing but will be directed against the body portion of the casing with the further result that the use of balls to compensate end thrust will be dispensed with.

By reason of the sectional construction of each of the rollers it will be manifest that the parts may be readily assembled and by the arrangement and provision of the proximate faces of the adjacent parts in the manner as shown all wear may be readily taken up.

Should it be necessary to grind any of the bearing faces it will be manifest that by removing portions of the abutting ends of the roller sections of the respective rollers the rollers may be adjusted, that is the parts of the rollers adjusted towards each other sufficiently to take up any wear which might occur.

Furthermore with this improved construction the side thrust as well as the end thrust of the rollers and of the floating sleeve will be transmitted through the rollers to the body portion or wall 14 of the bearing casing or box.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A roller bearing embodying a casing, a rotatable bearing member within the casing, the periphery of said member tapering from the center towards the opposite ends thereof, a member encompassing said bearing and spaced therefrom, the inner face of said member tapering from the ends towards the center thereof to form with the periphery of the bearing member surfaces diverging from the center towards the ends thereof, and elongated roller bearings disposed between said surfaces, each of said rollers tapering from their ends toward the longitudinal center of the roller and contacting with each of said diverging surfaces.

2. A roller bearing embodying a casing, a rotatable bearing member within the casing, the periphery of said member tapering from the center towards the opposite ends thereof, a member encompassing said bearing and spaced therefrom, the inner face of said member tapering from the ends towards the center thereof to form with the periphery of the bearing member surfaces diverging from the center towards the ends thereof, elongated roller bearings disposed between said surfaces, each of said rollers tapering from their ends towards the longitudinal center of the roller and contacting with each of said diverging surfaces, and annular members to which the respective ends of the rollers are journaled.

3. A roller bearing embodying a casing, a rotatable bearing member within the casing, the periphery of said member tapering from the center towards the opposite ends thereof, a member encompassing said bearing and spaced therefrom, the inner face of said member tapering from the ends towards the center thereof to form with the periphery of the bearing member surfaces diverging from the center towards the ends thereof, elongated roller bearings disposed between said surfaces, each of said rollers tapering from their ends towards the longitudinal center of the roller, each of said rollers embodying frustro-conical sections arranged end to end with the smaller ends in proximity to each other, a rod connected to and extending from one of the roller sections and passing into the other roller section, and means engaging the end of the rod and cooperating therewith to clamp said sections together.

4. A roller bearing embodying a casing, a rotatable bearing member within the casing, the periphery of said member tapering from the center towards the opposite ends thereof, a member encompassing said bearing and spaced therefrom, the inner face of said member tapering from the ends towards the center thereof to form with the periphery of the bearing member surfaces diverging from the center towards the ends thereof, elongated roller bearings disposed between said surfaces, each of said rollers tapering from their ends towards the longitudinal center of the roller, each of said rollers embodying frustro-conical sections arranged end to end with the smaller ends in proximity to each other, and means securing the sections of each of said rollers together for rotation in unison.

5. A roller bearing embodying a casing, a bearing member within the casing and of a diameter considerably less than the internal diameter of the casing, a floating sleeve encompassing the bearing member and spaced from said member and also from the inner face of said casing, the inner periphery of said sleeve and the periphery of said member being shaped to form bearing surfaces diverging from the longitudinal center of the sleeve and the said member outwardly towards the ends thereof, elongated rollers in the spaces formed by said diverging surfaces, portions of each of said rollers being shaped to conform to and contact with said diverging surfaces, the outer periphery of said sleeve and the inner face of said casing being shaped to form bearing surfaces diverging from the longitudinal center of the sleeve and of the casing towards the outer ends thereof, and elongated rollers between the last recited bearing surfaces contacting therewith and shaped to conform thereto.

6. A roller bearing embodying a casing, a bearing member within the casing and of a diameter considerably less than the internal diameter of the casing, a floating sleeve encompassing the bearing member and spaced from said member and also from the inner face of said casing, the inner periphery of said sleeve and the periphery of said member being shaped to form bearing surfaces diverging from the longitudinal center of the sleeve and the said member outwardly towards the ends thereof, elongated rollers in the spaces formed by said diverging surfaces, portions of each of the rollers being shaped to conform to said diverging surfaces, the outer periphery of said sleeve and the inner face of said casing being shaped to form bearing surfaces diverging from the longitudinal center of the sleeve and of the casing towards the outer ends thereof, elongated rollers between the last recited bearing surfaces, portions of each of the last said rollers contacting with and conforming to the shape of said diverging bearing surfaces, annular members to which the ends of the inner series of rollers is journaled, and a second annular member encompassing the first recited annular member and to which second recited annular member the outer series of rollers is journaled.

7. A roller bearing embodying a casing, a rotatable bearing member within the casing, the periphery of said member tapering from the center towards the opposite ends thereof, a member encompassing said bearing and spaced therefrom, the inner face of said member tapering from the ends towards the center thereof to form with the periphery of the bearing member surfaces diverging from the center towards the ends thereof, and elongated roller bearings disposed between said surfaces, each of said rollers tapering from their ends towards the longitudinal center of the roller, the ends of the rollers being maintained out of contact with the end walls of the said casing.

8. A roller bearing embodying a casing, a bearing member within the casing and of a diameter considerably less than the internal diameter of the casing, a floating sleeve encompassing the bearing member and spaced from said member and also from the inner face of said casing, the inner periphery of said sleeve and the periphery of said member being shaped to form bearing surfaces diverging from the longitudinal center of the sleeve and the said member outwardly towards the ends thereof, elongated rollers in the spaces formed by said diverging surfaces, portions of each of the rollers being shaped to conform to said diverging surfaces, the outer periphery of said sleeve and the inner face of said casing being shaped to form bearing surfaces diverging from the longitudinal center of the sleeve and of the casing towards the outer ends thereof, and elongated rollers between the last recited bearing surfaces contacting therewith and shaped to conform thereto, the ends of all of said rollers being maintained out of contact with the end walls of the said casing.

9. A roller bearing embodying a casing, a bearing member within the casing and of a diameter considerably less than the internal diameter of the casing, a floating sleeve encompassing the bearing member and spaced from said member and also from the inner face of said casing, the inner periphery of said sleeve and the periphery of said member being shaped to form bearing surfaces diverging from the longitudinal center of the sleeve and the said member outwardly towards the ends thereof, elongated rollers in the spaces formed by said diverging surfaces and shaped to conform thereto, the outer periphery of said sleeve and the inner face of said casing being shaped to form bearing surfaces diverging from the longitudinal center of the sleeve and of the casing towards the outer ends thereof, elongated rollers between the last recited bearing surfaces contacting therewith and shaped to conform thereto, each of said rollers embodying frustro-conical sections arranged end to end with the smaller ends in proximity to each other, and means for securing the respective said sections together for rotation in unison.

10. A roller bearing embodying a casing, a bearing member within the casing and of a diameter considerably less than the internal diameter of the casing, a floating sleeve encompassing the bearing member and spaced from said member and also from the inner face of said casing, the inner periphery of said sleeve and the periphery of said member being shaped to form bearing surfaces diverging from the longitudinal center of the sleeve and the said member outwardly towards the ends thereof, elongated rollers in the spaces formed by said diverging surfaces and shaped to conform thereto, the outer periphery of said sleeve and the inner face of said casing being shaped to form bearing surfaces diverging from the longitudinal center of the sleeve and of the casing towards the outer ends thereof, elongated rollers between the last recited bearing surfaces contacting therewith and shaped to conform thereto, each of said rollers embodying frustro-conical sections arranged end to end with their smaller ends in proximity to each other, and means carried by one of said sections and passing into the other section for connecting the sections together for rotation in unison.

11. A roller bearing embodying a casing, a bearing member within the casing and of a diameter considerably less than the internal diameter of the casing, a floating sleeve encompassing the bearing member and spaced from said member and also from the inner face of said casing, the inner periphery of said sleeve and the periphery of said member being shaped to form bearing surfaces diverging from the longitudinal center of the sleeve and the said member outwardly towards the ends thereof, elongated rollers in the spaces formed by said diverging surfaces and shaped to conform thereto, the outer periphery of said sleeve and the inner face of said casing being shaped to form bearing surfaces diverging from the longitudinal center of the sleeve and of the casing towards the outer ends thereof, elongated rollers between the last recited bearing surfaces contacting therewith and shaped to conform thereto, each of said rollers embodying frustro-conical sections arranged end to end with their smaller ends in proximity to each other, a projection extending from one of the sections and passing into the other section, and means co-operating with said projection for clamping the roller sections together for rotation in unison.

12. A roller bearing embodying a casing, elongated rollers within the casing, the portions of each of the rollers on opposite sides of the longitudinal center thereof being shaped to taper in opposite directions, and bearing surfaces between which the rollers are located, said surfaces conforming to the contour of the rollers and with which surfaces the rollers have rolling contact.

13. A roller bearing embodying a casing, elongated rollers within the casing, the portions of the rollers on opposite sides of the longitudinal center thereof being shaped to taper in opposite directions, bearing surfaces between which the rollers are located, said surfaces conforming to the contour of the rollers and with which surfaces the rollers have rolling contact, said rollers each embodying sections arranged end to end, and means for securing the sections together for rotation in unison.

14. A roller bearing embodying a casing, elongated rollers within the casing, the portions of each of the rollers on opposite sides of the longitudinal center thereof being shaped to taper in opposite directions, bearing surfaces between which the rollers are located, said surfaces conforming to the contour of the rollers and with which surfaces the rollers have rolling contact, and annular members arranged adjacent the ends of the rollers and to which members the rollers are journaled.

15. A roller bearing embodying a casing, a rotatable bearing surface therein, a sleeve encompassing said surface and spaced therefrom and from the inner surface of the casing, elongated rollers disposed between said surface and the adjacent surface of said sleeve, portions of each of the rollers on opposite sides of the longitudinal center thereof being shaped to taper in opposite directions, the said bearing surface and the proximate face of the sleeve being shaped to conform to the shape of the roller and with each of which surfaces the rollers have rolling contact, and a second series of elongated rollers disposed between the outer periphery of the said sleeve and the proximate face of the casing, portions of each of the last said series of rollers on opposite sides of the longitudinal center thereof being shaped to taper in opposite directions, the proximate faces of the sleeve and the casing being shaped to conform to the shape of the rollers and with each of which surfaces the last said rollers have rolling contact.

16. A roller bearing embodying a casing, a rotatable bearing surface therein, a sleeve encompassing said surface and spaced therefrom and from the inner surface of the casing, elongated rollers disposed between said surface and the adjacent surface of said sleeve, portions of each of the rollers on opposite sides of the longitudinal center thereof being shaped to taper in opposite directions, the said bearing surface and the proximate face of the sleeve being shaped to conform to the shape of the roller and with each of which surfaces the rollers have rolling contact, a second series of elongated rollers disposed between the outer periphery of the said sleeve and the proximate face of the casing, portions of each of the last said series of rollers on opposite sides of the longitudinal center thereof being shaped to taper in opposite directions, the proximate faces of the sleeve and the casing being shaped to conform to the shape of the rollers and with each of which surfaces the last said rollers have rolling contact, and annular members individual to the series of rollers and to which they are journaled and bodily rotatable with the respective series of rollers.

In testimony whereof I have signed my name to this specification, on this 25th day of July, A. D. 1927.

JOHN W. FOLEY.